United States Patent [19]
Lehmann

[11] Patent Number: 5,958,056
[45] Date of Patent: *Sep. 28, 1999

[54] METHOD AND APPARATUS FOR SELECTING OPERATING VOLTAGES IN A BACKPLANE BUS

[75] Inventor: Thomas S. Lehmann, Vancouver, Wash.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/979,000

[22] Filed: Nov. 28, 1997

Related U.S. Application Data

[63] Continuation of application No. 08/451,464, May 26, 1995, abandoned.

[51] Int. Cl.[6] .................................................. G06F 1/00
[52] U.S. Cl. ...................... 713/310; 713/340; 713/323; 710/102; 710/103
[58] Field of Search ...................... 395/750.02, 750.04, 395/750.07, 750.08, 750.06; 364/707; 710/101–103

[56] References Cited

U.S. PATENT DOCUMENTS

| | | | |
|---|---|---|---|
| 4,167,786 | 9/1979 | Miller et al. | 364/493 |
| 4,312,035 | 1/1982 | Greene | 364/200 |
| 4,611,289 | 9/1986 | Coppola | 364/492 |
| 4,677,566 | 6/1987 | Whittaker et al. | 364/492 |
| 4,809,163 | 2/1989 | Hirosawa et al. | 364/200 |
| 5,167,024 | 11/1992 | Smith et al. | 395/375 |
| 5,193,198 | 3/1993 | Yokouchi | 395/750 |
| 5,210,855 | 5/1993 | Bartol | 395/500 |
| 5,283,905 | 2/1994 | Saadeh et al. | 395/750 |
| 5,287,525 | 2/1994 | Lum et al. | 395/750 |
| 5,293,632 | 3/1994 | Novakovich et al. | 395/750 |
| 5,300,874 | 4/1994 | Shimamoto et al. | 320/15 |
| 5,301,334 | 4/1994 | Horiuchi | 395/750 |
| 5,329,491 | 7/1994 | Brown et al. | 365/226 |
| 5,339,445 | 8/1994 | Gasztonyi | 395/750 |
| 5,440,244 | 8/1995 | Richter et al. | 326/37 |
| 5,440,748 | 8/1995 | Sekine et al. | 395/750 |
| 5,446,905 | 8/1995 | Koshiishi | 395/750 |
| 5,457,801 | 10/1995 | Aihara | 395/750 |
| 5,481,730 | 1/1996 | Brown et al. | 395/750 |
| 5,530,810 | 6/1996 | Bowman | 395/283 |
| 5,537,584 | 7/1996 | Miyai et al. | 395/183.18 |
| 5,550,990 | 8/1996 | Keener et al. | 395/309 |
| 5,557,738 | 9/1996 | Townsley et al. | 395/182.12 |
| 5,608,275 | 3/1997 | Khosrowpour | 307/130 |
| 5,611,055 | 3/1997 | Krishan et al. | 395/281 |
| 5,613,130 | 3/1997 | Teng et al. | 395/750 |
| 5,663,918 | 9/1997 | Javanifard et al. | 365/226 |
| 5,675,809 | 10/1997 | Gantt | 395/750 |

*Primary Examiner*—Ayaz R. Sheikh
*Assistant Examiner*—Raymond N Phan
*Attorney, Agent, or Firm*—Blakely, Sokoloff, Taylor & Zafman

[57] ABSTRACT

A computer system wherein supply voltage are selectively coupled to a bus card. The computer system comprises a data bus and a voltage supply carrying a plurality of supply voltages. The computer system also includes a connector operative to receive a bus card that includes a plurality of power supply pins. A switching circuit is coupled in series between the connector and the voltage supply bus. The switching circuit selectively couples supply voltages to the power supply pins of the connector in response to determining the power requirements of the bus card.

16 Claims, 20 Drawing Sheets

METHOD AND APPARATUS FOR SELECTING OPERATING VOLTAGES IN A BACKPLANE BUS

This is a continuation of application Ser. No. 08/451,464, filed May 26, 1995 now abandoned.

FIELD OF THE INVENTION

The present invention relates generally to computer buses and more particularly to backplane buses that supply power to bus components.

BACKGROUND OF THE INVENTION

A computer system typically includes a computer bus that operates as a communications interconnect for components of the bus. A typical type of computer bus is the parallel backplane bus, examples of which include Multibus I, Multibus II, NuBus, VMEbus, STD bus, ISA bus, and EISA bus.

To establish communications between bus components, parallel backplane buses typically include address, data, and control lines that are coupled to each of the components of the computer system. Parallel backplane buses also typically include one or more power and ground lines connected to a central system power supply for supplying power to bus components. The central system power supply typically couples common power supply voltages such as ±5 volts and ±12 volts to the power lines.

Physically, parallel backplane buses may be implemented on a printed circuit board ("PC board") that includes a number of expansion slots, and bus cards having proper connectors may be coupled to the parallel backplane bus via the expansion slots as components of the bus. Once connected to the bus, bus cards are powered by the power and ground lines of the bus.

The voltages supplied by a bus via power lines are typically selected in view of common operating voltages for semiconductor devices that comprise the PC board components. Unfortunately, as semiconductor processing technology improves, the typical operating voltage for semiconductor devices continues to drop in value, and the voltages typically required by bus components may change after a bus architecture is finalized. For example, the operating supply voltage for TTL devices is 5.0 volts wherein the operating supply voltage for CMOS devices is 3.3 volts, and the use of CMOS devices in computer systems is becoming increasingly prevalent. Further, the operating supply voltage for some CMOS devices continues to drop to values such as 2.9 volts and 2.4 volts. The selection of the voltages supplied by a bus may also be influenced by other considerations such as a limited number of pins for each expansion connector.

To allow semiconductor devices that operate at 3.3 volts or less to operate when only 5.0 volts and 12.0 volts is supplied by the bus, many bus cards include buck-type DC-DC converters or other voltage regulation circuitry to convert 5.0 volts (or 12.0 volts) to the reduced voltage required by the semiconductor devices. A bus card may similarly require a charge pump circuit to boost a lower voltage to a higher voltage so that semiconductor devices requiring voltages higher than those provided by the bus may be powered by the bus. One disadvantage of voltage regulation circuitry such as DC-DC converters and charge pumps is that such circuitry requires valuable space on the bus card. Even the most efficient of voltage regulation circuitry may result in some power losses that are manifested as heat, and heat generated by voltage regulation circuitry may cause component failure under the right conditions. Further, the use of voltage regulation circuitry results in ad hoc solutions that may increase the cost of each bus card. Thus, bus card-based solutions to incompatible operating supply voltages are not desirable.

An alternative solution requires providing an additional edge connector for each bus card and the hardwiring of new power lines to the bus card via the additional edge connector. While such a solution allows a lower voltage bus card to operate without the use of voltage regulation circuitry, if a bus card requiring 2.4 volts is plugged into an expansion slot to which only 3.3 volts has been routed, the devices of the bus card may be damaged if no voltage regulation circuitry is included on the bus card. Therefore, merely hardwiring new power lines to an expansion slot is also an ad hoc solution, and it would be desirable to provide a more flexible solution to the problem of bus components that require an operating voltage other than those supplied by the bus.

SUMMARY OF THE INVENTION

It is therefore an object of the present invention to provide a computer system wherein supply voltages are applied to a bus card based on the power supply requirements of the bus card.

This and other objects of the invention are provided by a computer system comprising a data bus and a voltage supply bus carrying a plurality of supply voltages. The computer system also includes a connector operative to receive a bus card, wherein the connector includes a plurality of power supply pins for providing supply voltages to the bus card. A switching circuit is coupled in series between the connector and the voltage supply bus. The switching circuit selectively couples supply voltages to power supply pins of the connector in response to determining the power requirements of the bus card.

Other features and advantages of the present invention will be apparent from the accompanying drawings and from the detailed description which follows below.

BRIEF DESCRIPTION OF THE DRAWINGS

The present invention is illustrated by way of example and not limitation in the Figures of the accompanying drawings, in which like references indicate similar elements, and in which.

DETAILED DESCRIPTION

Figure 1:
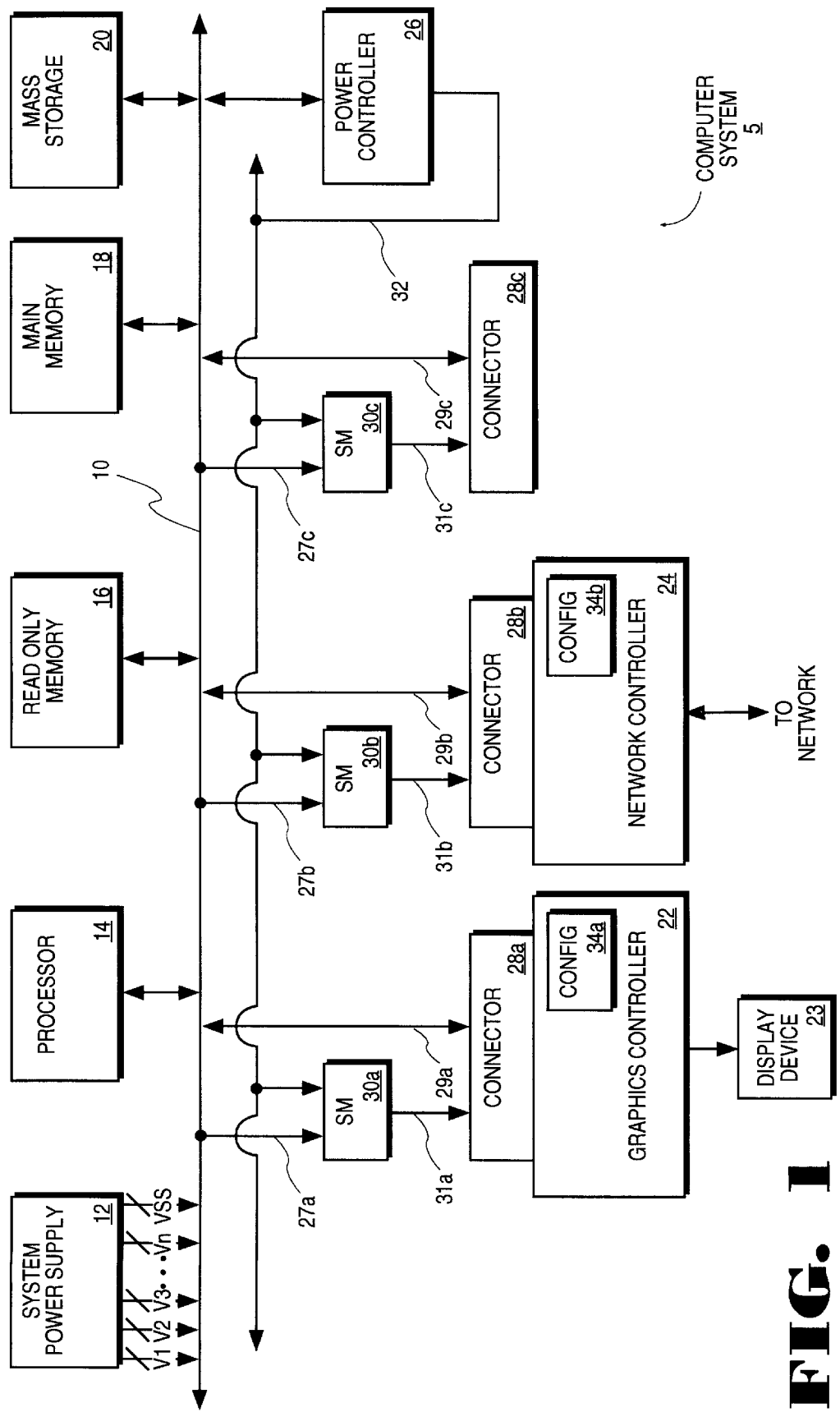
FIG. 1 shows a computer system according to one embodiment.

FIG. 1 shows a computer system according to one embodiment. The computer system 5 includes a bus 10, that may be implemented as a parallel backplane bus. Bus 10 includes a number of conductors for transferring information between bus components (a data bus) as well as a number of conductors for carrying operating voltages to bus components (a voltage supply bus). The conductors that carry information may include data lines, address lines, and control lines. System power supply 12 is coupled to the power conductors of bus 10 and outputs a plurality of voltages, V1–VN, and system ground VSS. Bus 10 operates such that bus addresses are determined by a bus card's physical location on bus 10.

Bus components may be coupled directly to the bus, or they may be coupled to the bus as bus cards via a generic connector 28, which may be implemented as an expansion slot. The bus components of bus 10 include processor 14, read only memory 16, main memory 18, mass storage device 20, graphics controller 22, network controller 24, and power controller 26. While each of the above components may be bus cards coupled to bus 10 via connector 28, only the graphics controller 22 and the network controller 24 are shown as bus cards.

As shown, graphics controller 22 is coupled to the bus 10 via connector 28a. Connector 28a is coupled to receive supply voltages from a switch matrix 30a via signal lines 31a. Data lines of bus 10 are coupled to the connector 28a via data lines 29a. The switch matrix 30a is coupled to receive each of the supply voltages output by the system power supply 12 via supply voltage lines 27a. A display device 23 is coupled to the output of the graphics controller 22.

Network controller 24 is similarly coupled to bus 10 via an associated connector 28b and data lines 29b. Connector 28b receives supply voltages from the switch matrix 30b via the conductors 31b. Connector 28c in an unused expansion slot, and connector 28c has similar connections as described with respect to connectors 28a and 28b.

Graphics controller 22 and network controller 24 include power configuration circuits 34a and 34b, respectively. Each power configuration circuit 34 stores information regarding the power requirements of its associated bus card. This information may include a separate power supply voltage requirement for each supply voltage pin of connector 28, or the information may specify which of a plurality of different mappings of supply voltages to supply voltage pins is to be used. Each power configuration circuit 34 may be implemented as combinational logic, a processor, or a microcontroller. According to the present embodiment, each power configuration circuit 34 is a microcontroller that can be polled by power controller 26 via data bus 10 to determine the supply voltage pin configuration for the associated system component of power configuration circuit 34.

Each of the switch matrices 30a–30c operate to selectively couple one of N different supply voltages to each of K supply voltage pins of a connector 28, and power controller 26 controls the connections made by the switch matrices 30a–30c via control bus 32. According to one embodiment, control bus 32 comprises a set of control signal lines for each switch matrix.

Figure 2:
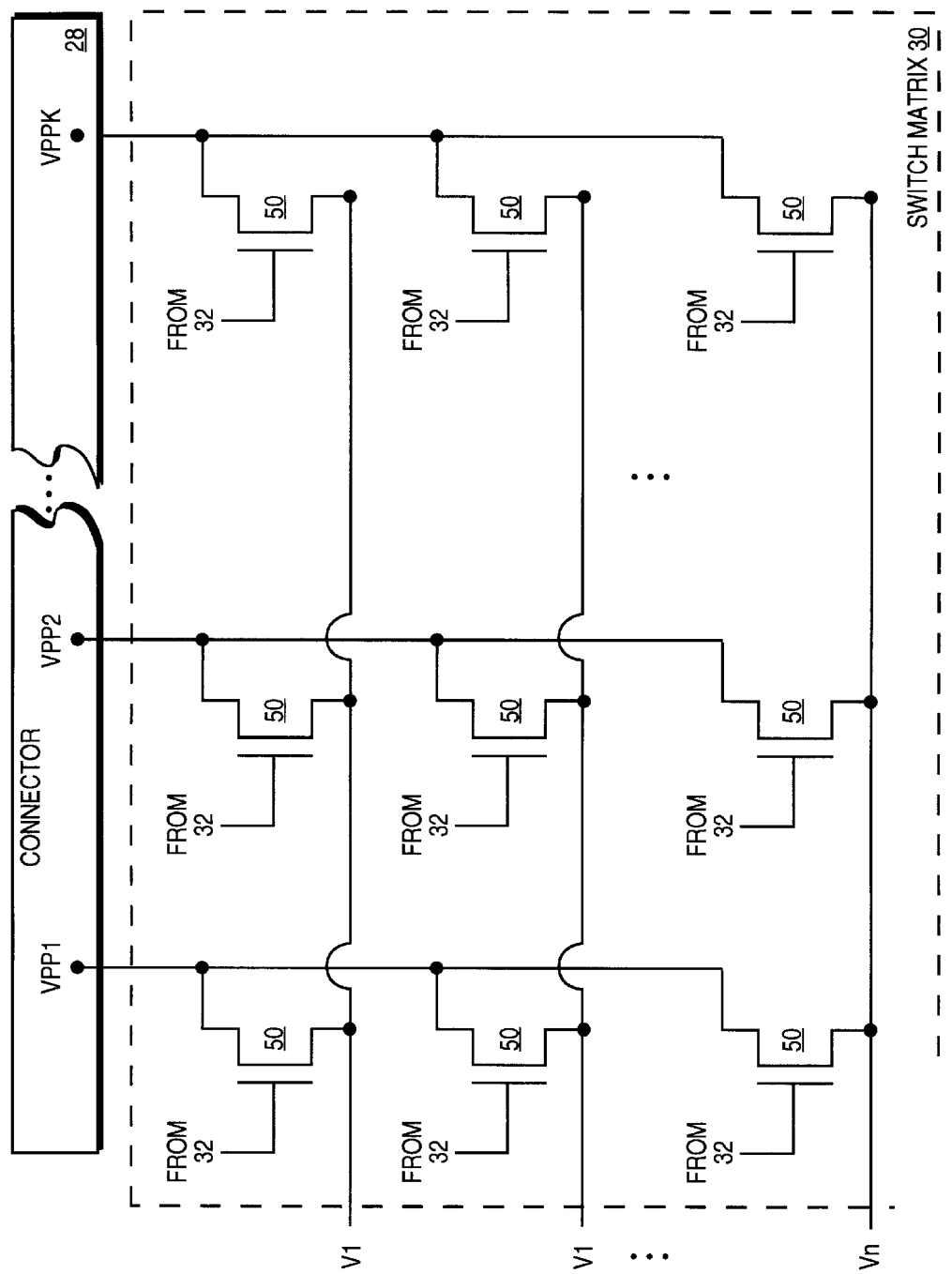
FIG. 2 shows a switch matrix according to one embodiment.

FIG. 2 shows a switch matrix 30 according to one embodiment. As shown, each connector 28 includes a number K of power supply pins VPP1–VPPK. Switch matrix 30 comprises a total of N×K of solid state switches 50 wherein each solid state switch 50 is coupled between one of the N supply voltages and one of the K power supply pins. Each solid state switch 50 is controlled by the power controller 26 via the control lines 32. According to one embodiment, control bus 32 includes one control line for each solid state switch 50 of each switch matrix 30.

Figure 3:
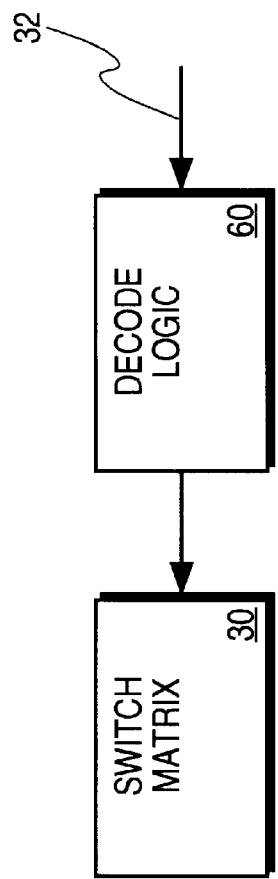
FIG. 3 shows decode logic as being inserted in the path between the control bus and the switch matrix.

The size of control bus 32 may become excessive when the numbers N and K are large. The number of control lines may be reduced by encoding the control signals carried by control bus and using decoding logic at the switch matrix 30 to switch on the appropriate solid state switches. For example, wherein N and K equal four, the total number of different combinations that may be achieved is $N^K$ or $4^4$, which is 256. The 256 combinations may be represented in binary using only eight bits. Thus, only eight control lines are required instead of sixteen. FIG. 3 shows decode logic 60 as being inserted in the path between the control bus 32 and the switch matrix 30.

Figure 4:
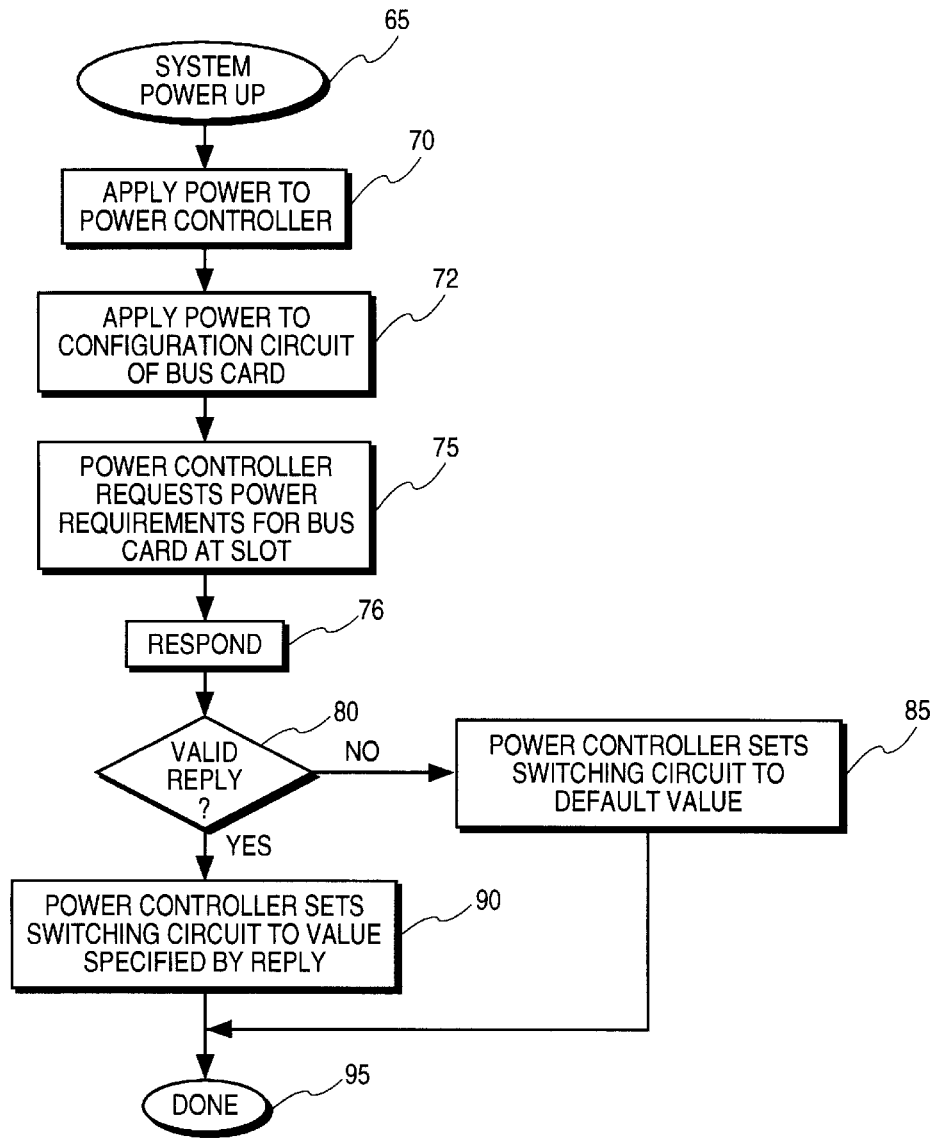
FIG. 4 is a flow chart showing one method of operation for the computer system.

FIG. 4 is a flow chart showing one method of operation for computer system 5. At process block 65, computer system 5 is powered up, which may occur, for example, when a user switches the computer system on. At process block 70, power is applied to power controller 26, and power is applied to the configuration circuit of the bus card at process block 72. Applying power to the configuration circuit may entail defining one or more power supply pins of the connector 28 as being directly coupled to a default voltage. Alternatively, the one or more power pins of the connector 28 may be defined to a default voltage, but the power controller 26 controls when the predefined voltage is coupled to the configuration circuit upon detecting that a bus card resides in the connector 28.

At process block 75, the power controller 26 requests the power requirements for the bus card. For example, after detecting that the graphics controller 22 is connected to connector 28a, power controller 26 enables the five volts voltage supply line to be switched to predefined pins of the connector 28a such that configuration circuit 34a is powered up. Power controller 26 then issues a power configuration request via the bus 10 which is received by the configuration circuit 34a via data lines 29a and connector 28a. At process block 76, the graphics controller 22 responds to the power controllers request with configuration information.

It is possible that a bus card that does not support self configuration of power supply pins may be connected to the bus via connectors 28. For such a case, the power controller 26 includes a default value that corresponds to the defined pins according to the standard practice by the bus 10. Thus, at process block 80, power controller 26 determines if a valid reply has been received. If no a valid reply has been received, the power controller 26 switches circuit 30a to the default value such that connector 28a is connected as specified by the bus standards practiced by bus 10. For example, if bus 10 follows the Multibus II architecture, connector 28 is- configured according to the Multibus II standard. If a valid reply is received by power controller 26, power controller 26 sets switch matrix 30a such that the supply pins of connector 28a are mapped as defined by the configuration information.

Power controller 26 may be implemented using combinational logic, a state machine, or a processor. Configuration circuitry 34 may be implemented as a microcontroller, a processor, or a state machine. The manner in which configuration requests and replies to configuration requests are performed may be determined by the communications protocol the bus standard adopted by the bus 10.

Figure 5:
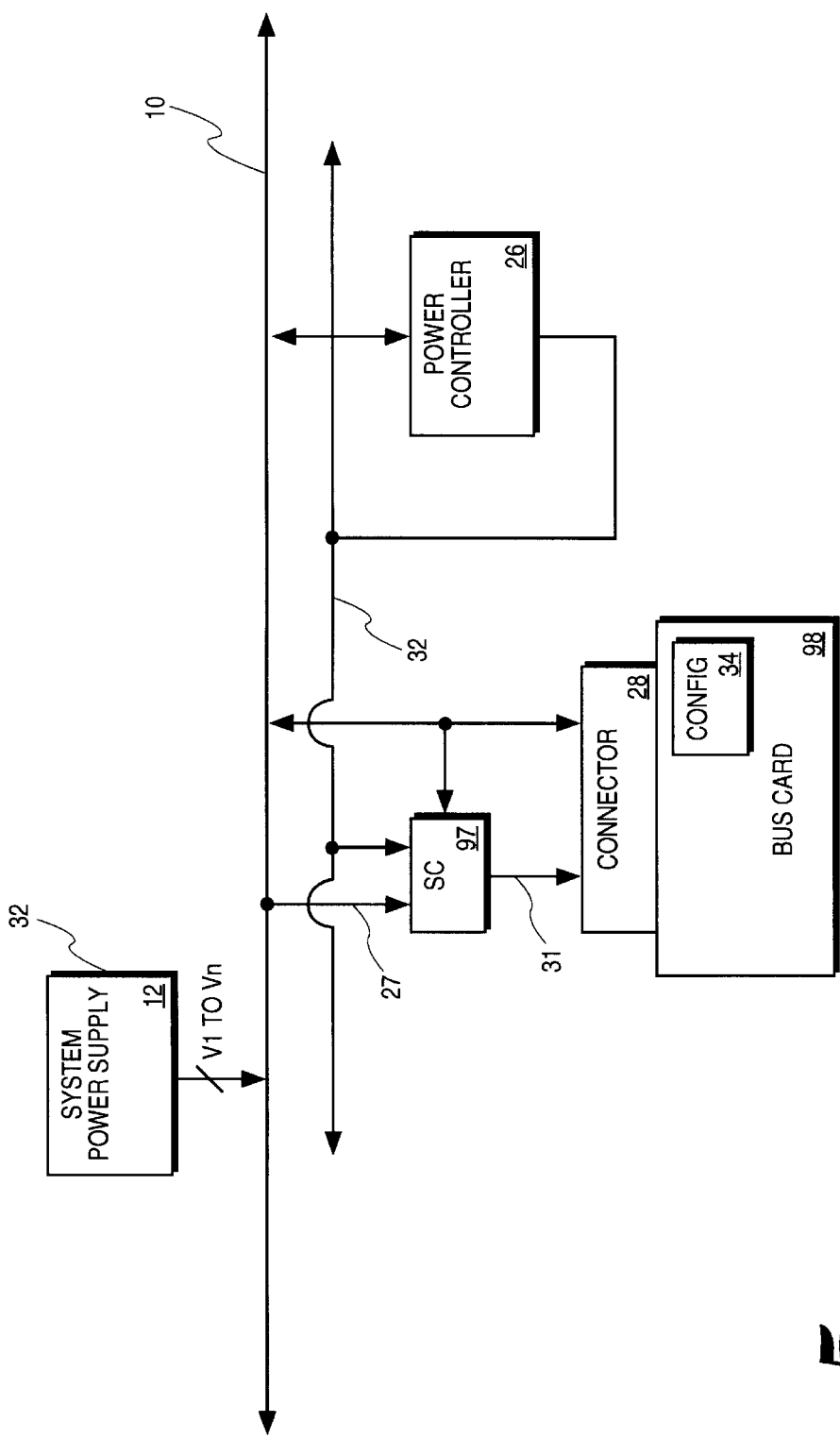
FIG. 5 shows a system according to an alternative embodiment wherein a switching circuit replaces each switch matrix.

FIG. 5 shows an alternative embodiment wherein a switching circuit 97 replaces each switch matrix 30. When control lines 32 are used by the power controller 26 to control the operation of the switches in switch matrix 30, a large number of control lines may be required to uniquely control each switching circuit. According to the embodiment shown in FIG. 5, control lines 32 are used by the switching circuits of computer system 5 as a globally shared address bus, and power controller 26 selects switching circuit 97 by sending a uniquely defined address for that switching circuit via control lines 32. No information defining which switches of the switching circuit 97 to turn is conveyed by control lines 32. Instead, the switching circuit 97 is coupled to the data lines 29 of bus 10 for receiving the configuration information directly from the bus card 98.

Figure 6:
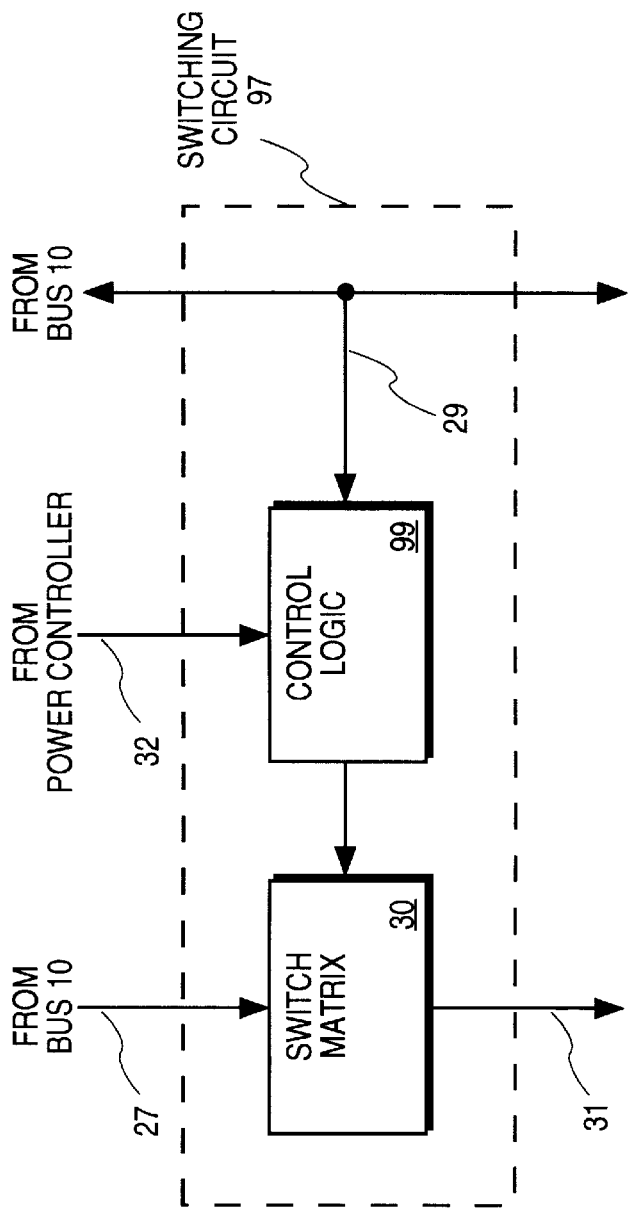
FIG. 6 shows the switching circuit in more detail.

FIG. 6 shows the switching circuit 97 in more detail. As shown, switching circuit 97 includes a switch matrix 30 that is controlled by control logic 99. Control logic 99 may include decode logic that allows a selection of one of N voltages for each of K power supply pins. Control logic 99 is coupled to data lines 29 for latching configuration information supplied to the bus by the bus card 98. Power controller 26 enables control logic 99 to latch data from data lines 29 via control lines 32. As power controller 26 is aware of which bus card it is selecting to output its configuration information, power controller 26 is similarly aware of the switching circuit 97 that needs to be enabled. Like the bus of FIG. 1, the bus of FIG. 5 assumes that the bus addresses are geographically determined such that power controller 26 knows to which connector a particular bus card is coupled.

Figure 7:
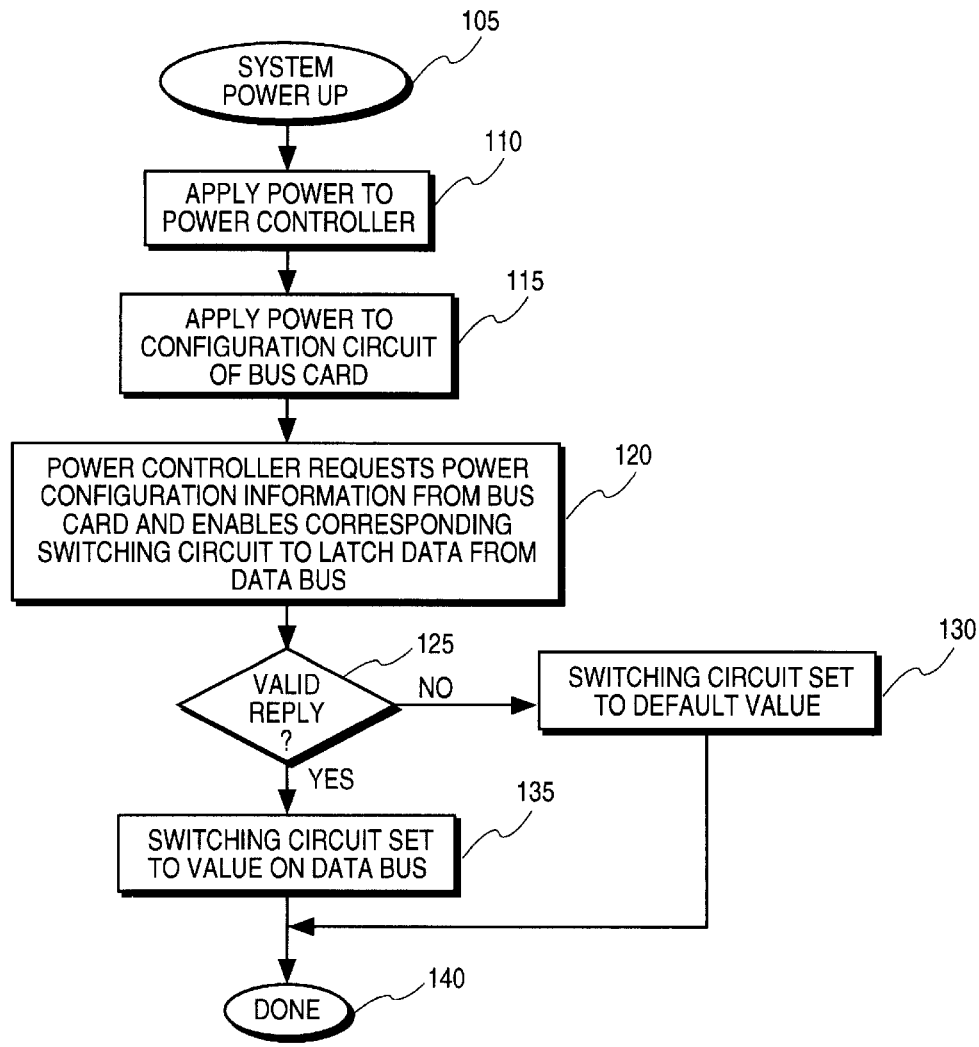
FIG. 7 is a flow chart showing a method according to one embodiment.

FIG. 7 is a flow chart showing a method according to one embodiment. Process block 105, the system is powered up. At process block 110, power is applied to power controller 26, and power is applied to the configuration circuit 34 of bus card 98 at process block 115. At process block 120 power controller 26 requests power configuration information from bus card 98 via data bus 10 and enables the corresponding switching circuit 97 to latch data from the data lines via control lines 32. Control logic 99 of switching circuit 97 determines whether a valid reply is received at process block 125. An invalid reply will be received, for example, when the bus card does not support the sending of power configuration information to the power controller via the bus. If the reply is invalid, the switching circuit is set to a default value. Control logic 99 may include a state machine that determines whether a reply is valid. If control logic 99 determines that a valid reply containing appropriate power configuration information is received from the configuration circuit 34 of bus card 98 via data lines 29, control logic 99 causes switch matrix 30 of switching circuit 97 to map the power supply voltages to the appropriate supply voltage pins of connector 28. The process ends at process block 140. The process is repeated for each system component that is implemented as an add-in bus card.

Figure 8:
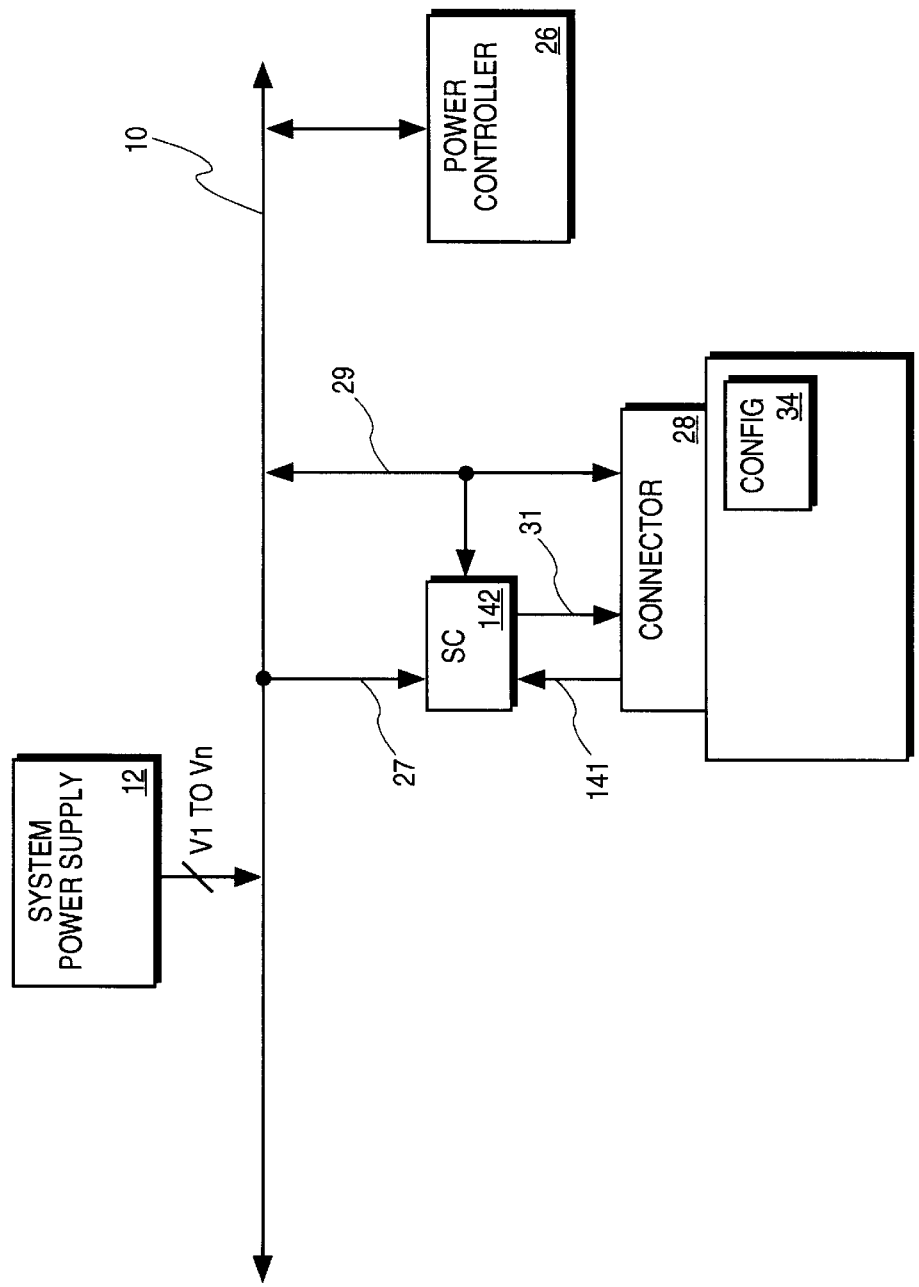
FIG. 8 shows a system that provides for the individual mapping of supply voltages to power supply pins in a bus that does not support geographical addressing.

The bus systems described with respect to FIGS. 1–7 presume that addressing is geographical such that the power controller 26 is aware of which switch matrix to control in response to power configuration information received from a bus card at a particular address. Some buses such as the ISA bus do not support geographical addressing, and some modification of the systems shown in FIGS. 1–7 is required. FIG. 8 shows a system that provides for the individual mapping of supply voltages to power supply pins in a bus that does not support geographical addressing. Computer system 5 shown in FIG. 8 includes a control conductor 141 that is routed from connector 28 to switching circuit 142. Many times, one or more pins of a connector as defined by a bus architecture standard is reserved for future use, a control signal may be routed through such a pin. Alternatively, as most of the voltage pins are disabled when the bus card is initially connected to bus 10 via connector 28, one of the voltage pins may be multiplexed for initial use as an enable pin. In FIG. 8, switching circuit 142 is coupled to voltage supply lines 27 and to data lines 29 (as shown in FIG. 1). According to one embodiment, power controller 26 can request the configuration circuitry 34 of the bus card 98 to configure its switching circuit 142. In response to the power configuration request, configuration circuitry 34 enables its associated switching circuit 142 by sending an enable signal via the appropriate pin of connector 28 and enable line 141. After switching circuit 142 is enabled, the configuration circuit 34 transmits power configuration information to the switching circuit 142 via data lines 29.

Figure 9:
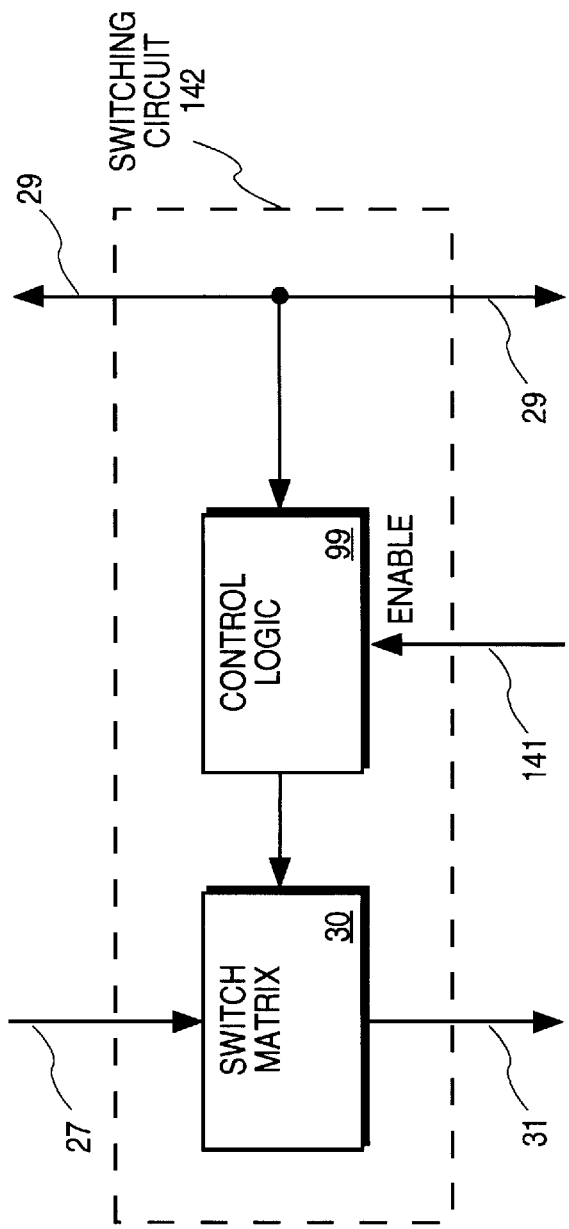
FIG. 9 shows the switching circuit in more detail.

FIG. 9 shows switching circuit 142 in more detail. Switching circuit 142 is shown as including switch matrix 30 that is controlled by control logic 99. As shown, control logic 99 is enabled by enable line 141 to latch data from the data lines 29.

Figure 10:
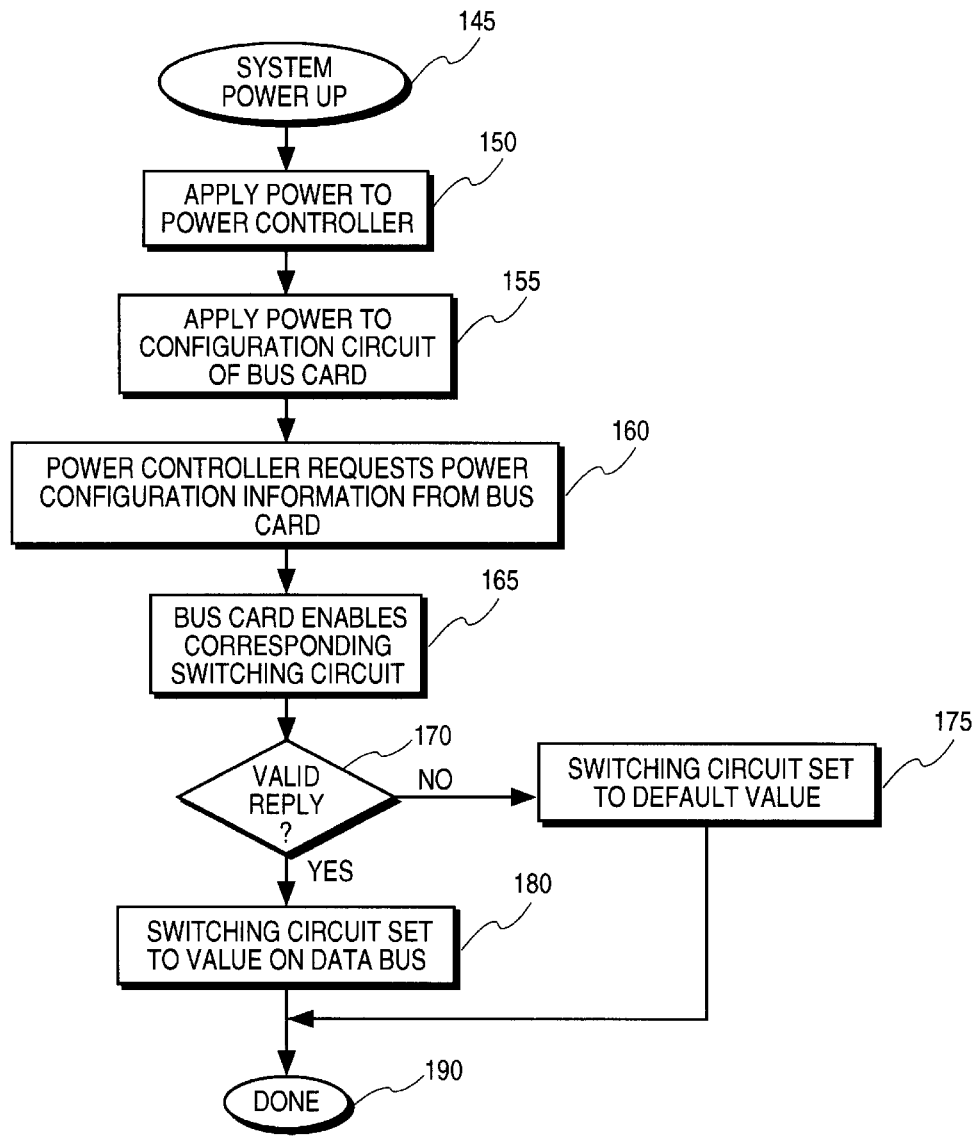
FIG. 10 is a flow chart showing one embodiment of a method for operating the system of FIG. 8.

FIG. 10 is a flow chart showing one embodiment of a method for operating the system of FIG. 8. Computer system 5 is powered up at process block 145, and power is applied to the power controller (as shown in FIGS. 1 and 5), at process block 150. At process block 155, power is applied to the configuration circuit of the bus card 98. Power controller 26 requests the bus card 98 to configure its voltage supply pin at process block 160, and the bus card 98 enables its corresponding switching circuit 142 using the enable line 141 at process block 165. If switching circuit 142 does not detect a valid reply at process block 170, switching circuit 142 sets the mapping of the supply lines to the supply pins to a default value at process block 175.

While the control lines 32 (shown in FIG. 5) are not necessary in the system of FIG. 8, it may be useful to supply such control lines in order to provide a time-out mechanism wherein a switching circuit can determine that a bus card not supporting the supply configuration system is inserted into its corresponding connector. For example, the power controller may assert the control line to indicate to all switching circuits that the initialization of bus is occurring. The power controller can include a timer set to a worst case time such that the control signal on control line 32 is deasserted after a maximum time. When switching circuit 142 detects that control line 32 is deasserted, switching circuit 142 sets the switch matrix 30 to a default mapping if configuration has not already occurred. If the switching circuit detects a valid reply on the data lines 29, switching circuit 142 maps the supply voltages to the supply pins as dictated by configuration information received from the data lines 29. The process ends at process block 190.

Figure 11:
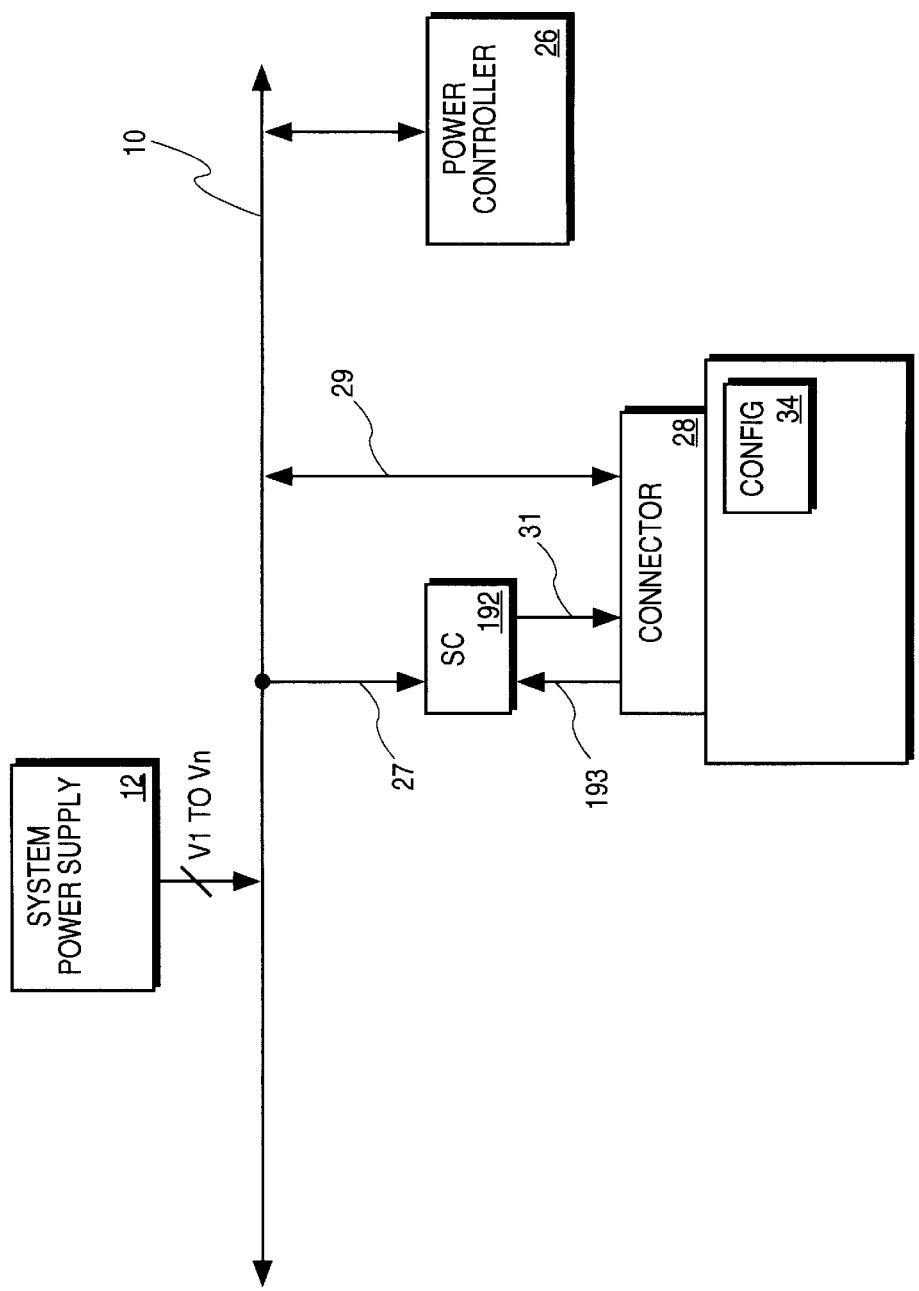
FIG. 11 shows another system that allows for individual connector configuration for each component of a computer system.

FIG. 11 shows another system that allows for individual connector configuration for each component of a computer system. Unlike the system of FIG. 8, the data lines 29 are not supplied to the switching circuit 192. Instead, conductors 193 include lines sufficient to provide configuration information directly to the switching circuit 192. This embodiment may be useful wherein it is desirable to provide a new connector in addition to connectors that are already defined for a bus card of a system.

Figure 12:
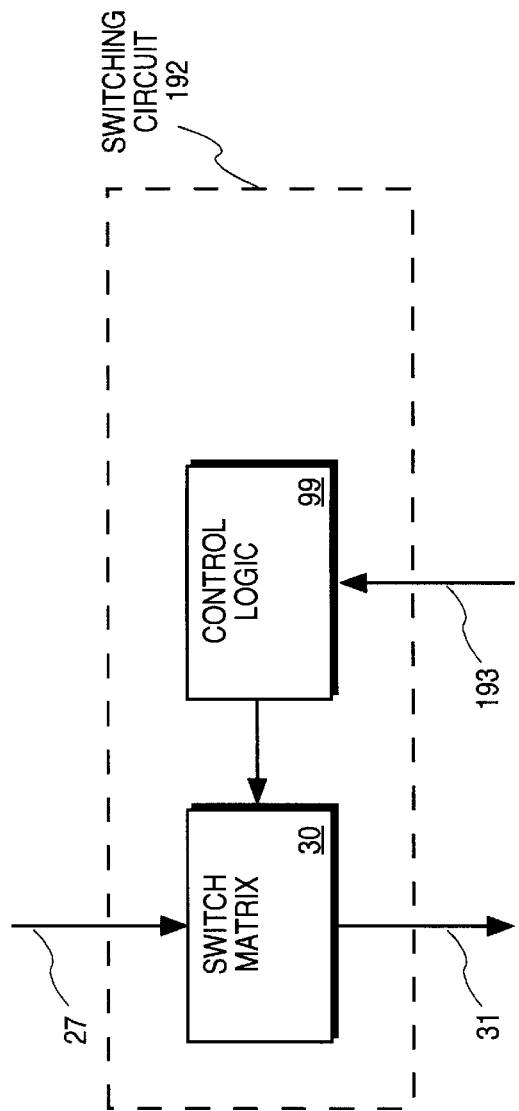
FIG. 12 shows the switching circuit as including switch matrix and control logic.

FIG. 12 shows switching circuit 192 as including switch matrix 30 and control logic 99. Control logic 99 is enabled and receives configuration information directly from the configuration circuitry 34 via signal lines 193. Control logic 99 controls switch matrix 30 in response to the received configuration information.

Figure 13:
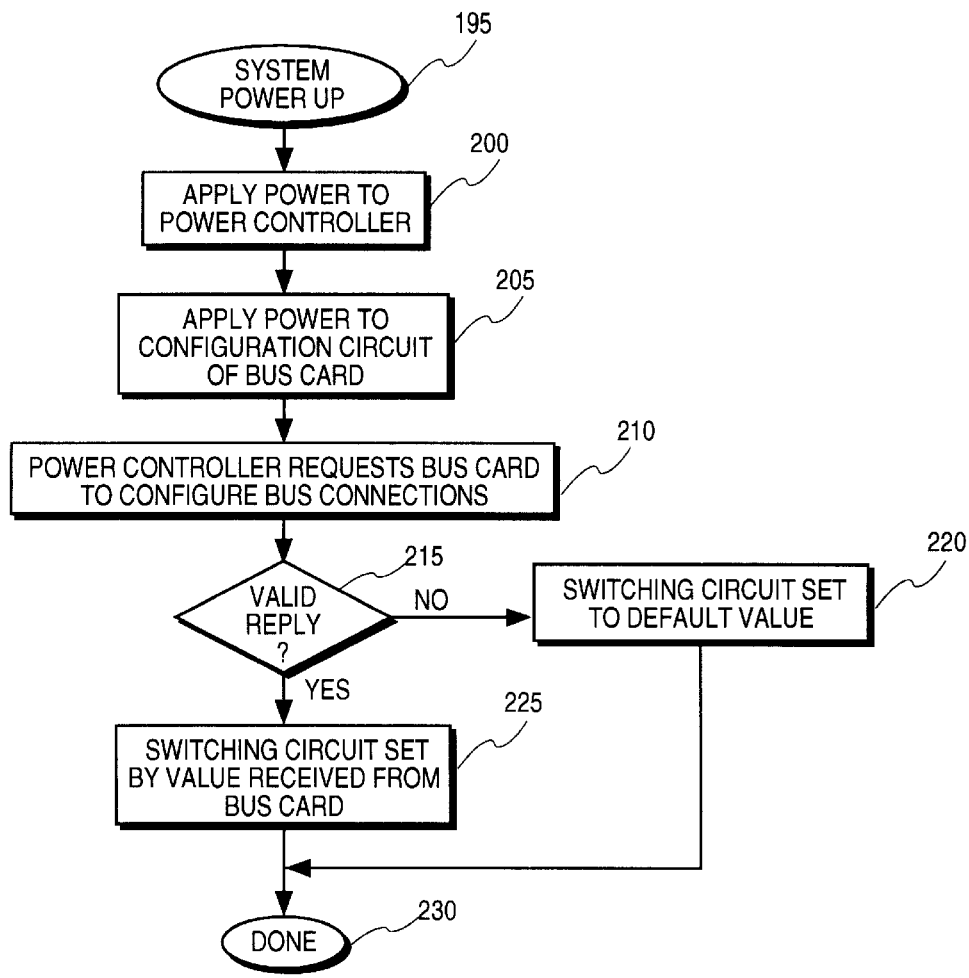
FIG. 13 is a flow chart showing a method according to one embodiment for operating the system shown in FIG. 11.

FIG. 13 is a flow chart showing a method according to one embodiment for operating the system shown in FIG. 11. The computer system is powered up at process block 195, and power is applied to power controller at process block 200 and to the configuration circuit of the bus card at process block 205. The power controller requests the bus card to configure its power connections at process block 210, and the control logic of the switching circuit determines whether a valid reply is received via the signal lines 193 at process block 215. If no valid reply is received at process block 220 the switching circuit sets the power pins to a default value. If a valid reply is received at process block 215, the switching circuit the power pins to the appropriate values determined by the configuration information at block 225. The process completes at process block 230.

Figure 14:
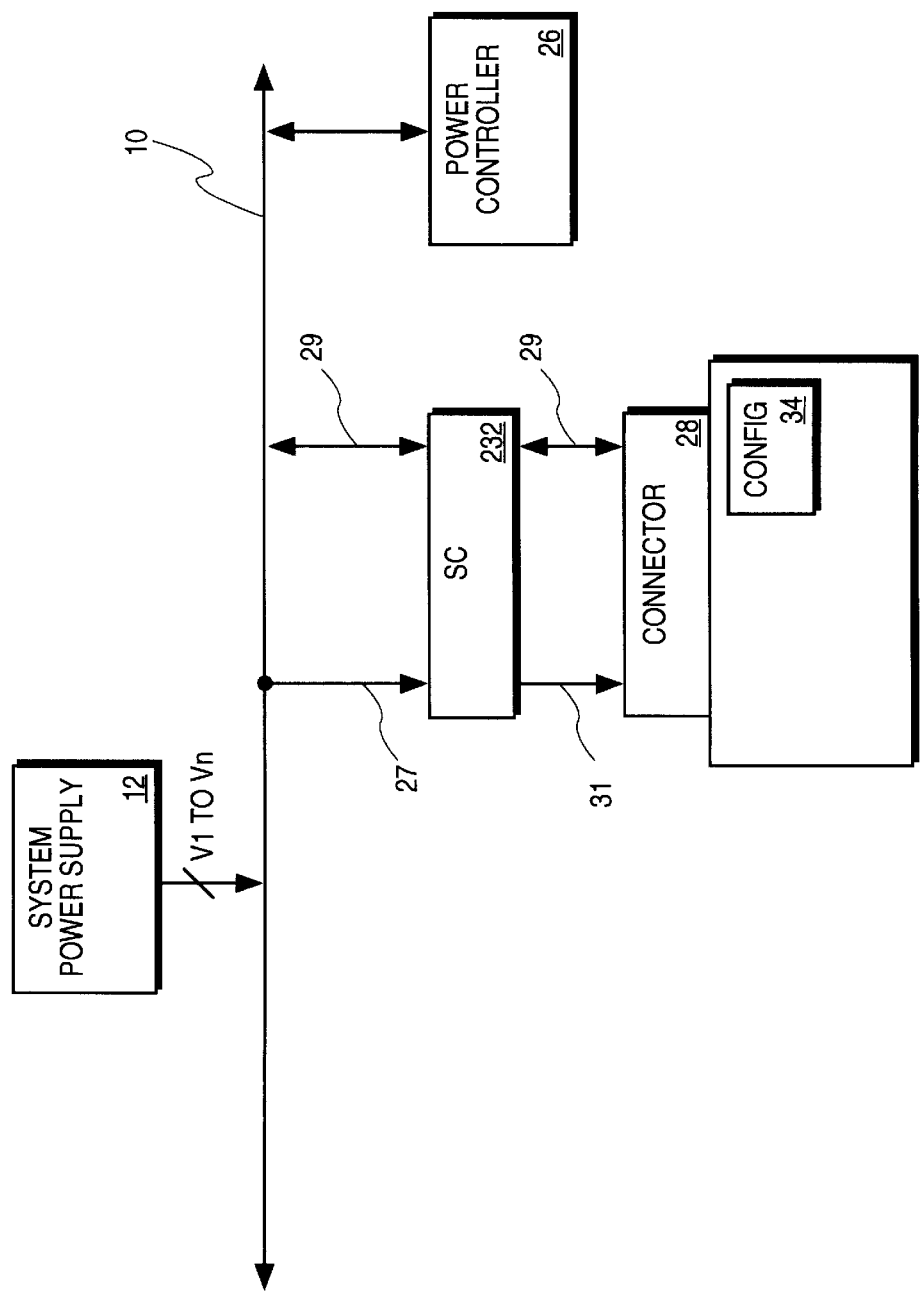
FIG. 14 shows a system according to another alternative embodiment.

FIG. 14 shows yet another alternative embodiment. The embodiments shown with respect to FIGS. 8 and 10 assume a best case wherein the loading of the bus 10 will not effect the data received by a switching circuit. The switching circuit 232 of FIG. 14 allows for the multiplexing of the data pins of the connector such that when the bus card 98 is originally connected to the connector 28, the data lines are coupled directly to the switching circuit and decoupled from the bus 10. In this configuration, a power controller is not required to request configuration information from the configuration circuitry 34 of the bus card 98. Instead, as soon as a bus card is coupled to the connector 28, the configuration circuitry 34 sends an enable signal to the switching circuit via the data lines 29. If no enable signal is sensed by the switching circuit 232, the switching circuit will set the supply pins of connector 28 to a default value. Otherwise, the switching circuit 232 receives the power configuration directly from the configuration circuitry 34, and the power supply pins of connector 28 are set appropriately.

Figure 15:
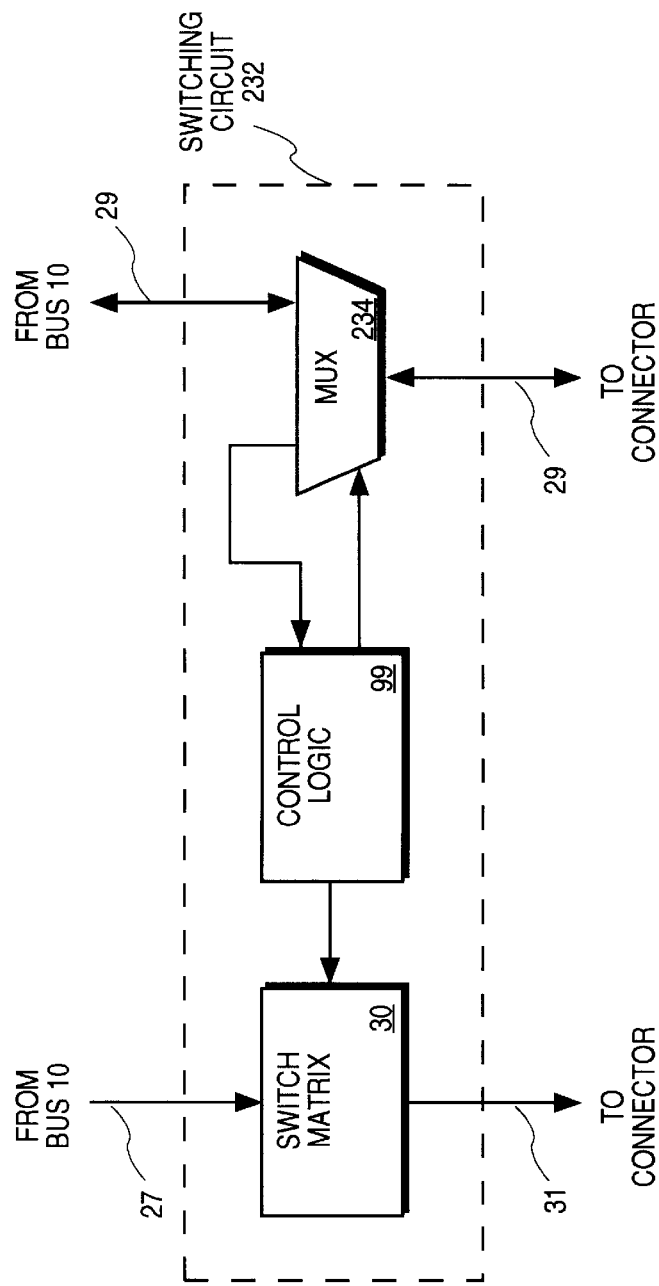
FIG. 15 shows the switching circuit in more detail.

FIG. 15 shows the switching circuit 232 in more detail. The switching circuit 232 is shown as including switch matrix 30 which is controlled by control logic 99. The data lines of the connector 28 are multiplexed to be routed either to the data lines of the bus 10 or to the control logic 99. Upon system power up, the switching circuit associated with each connector is set such that the multiplexor 234 routes the data lines of the connector to the control logic 99. If no enable signal is received via the connector, the control logic maintains this state such that a high impedance is seen by the bus 10. After control logic 99 sets the switch matrix 30 in response to configuration information, control logic 99 controls the multiplexor 234 such that the data lines of the connector are coupled to the bus 10. Control logic 99 may comprise a state machine or a combinational logic as appropriate. Operation of the switching circuit 232 may be done in accordance with the flow charts of the above methods with the exception that no power controller is required.

Figure 16:
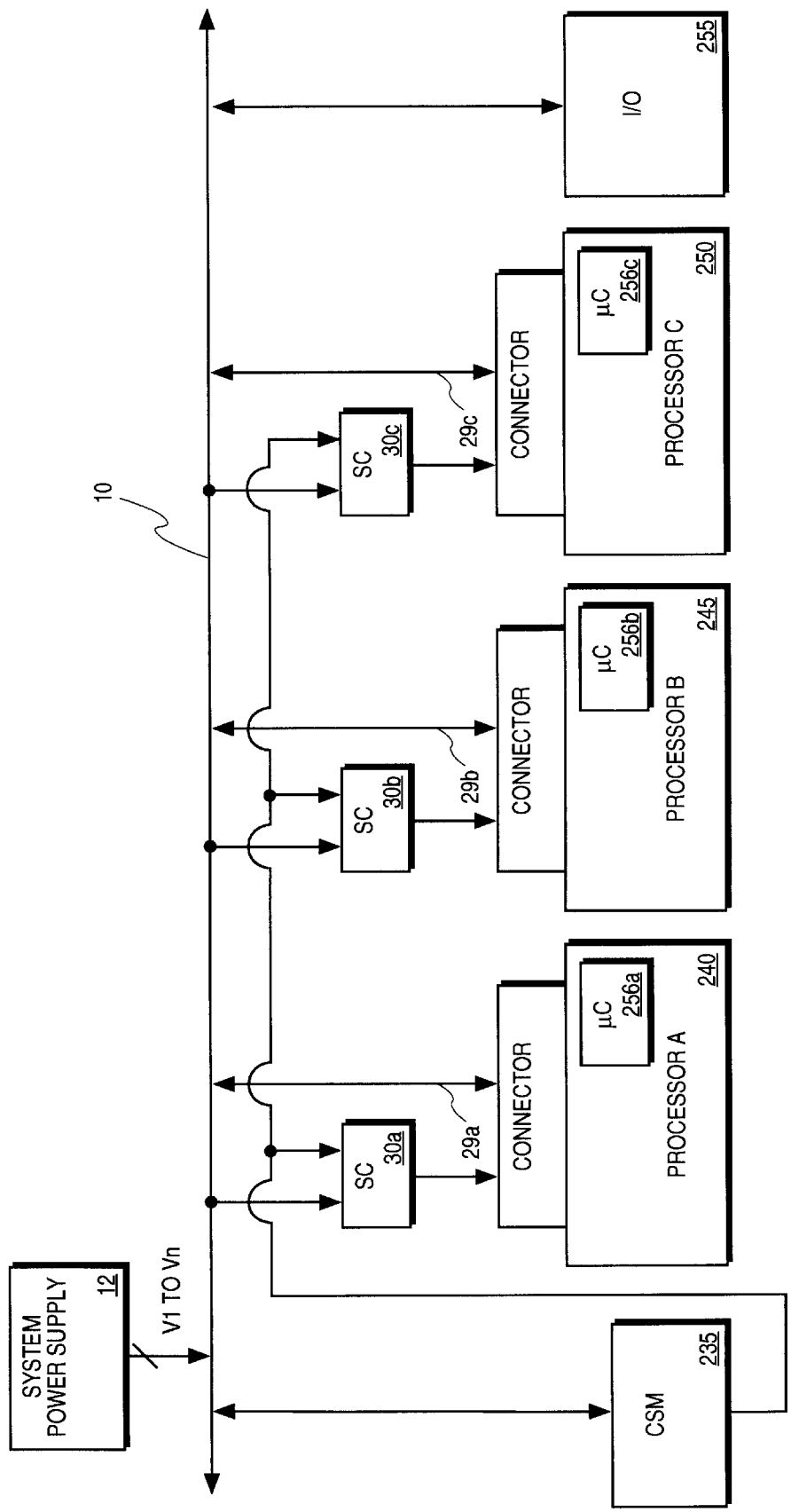
FIG. 16 shows an exemplary implementation of one of the systems described with respect to FIGS. 1–15.

FIG. 16 shows an exemplary implementation of one of the systems described with respect to FIGS. 1–15. Specifically, the architecture of FIG. 16 is most similar to that of FIGS. 1 and 5. Bus 10 operates according to the Multibus II protocol as defined by IEEE bus standard P1296. The components of bus 10 are shown as including a central services manager (CSM) 235, processor A 240, processor B 245, processor C 250, and I/O controller 255. The central services manager 235 operates as a power controller. By default, CSM 235 is located in slot 0 of bus 10 and is responsible for initializing and configuring the bus. Each of the processors A–C includes a microcontroller 256.

Figure 17:
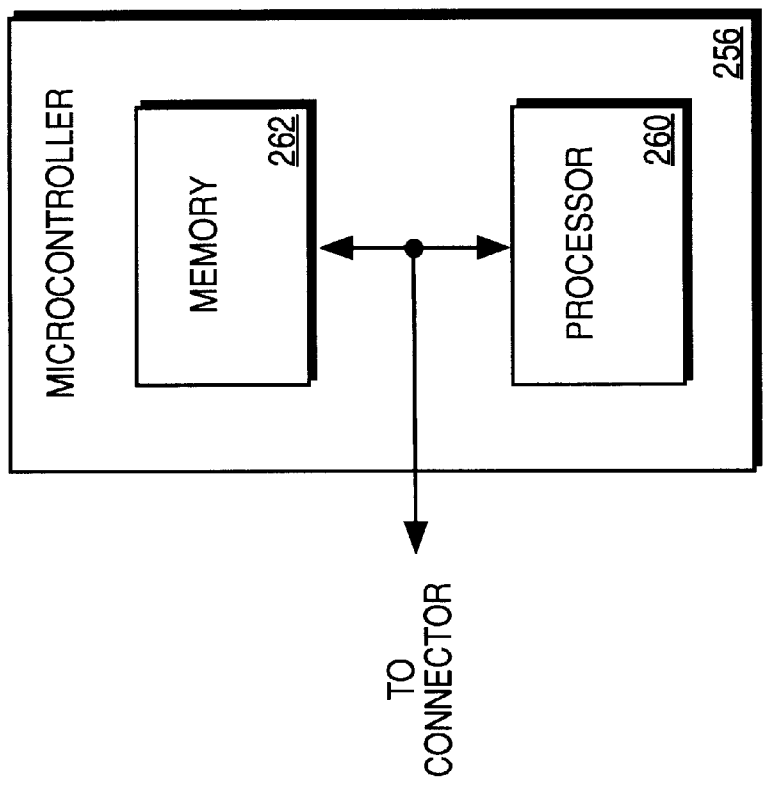
FIG. 17 shows a microcontroller in more detail.

FIG. 17 shows a microcontroller 256 in more detail. As shown, microcontroller 256 includes a processor 260 and memory 262. A memory may be a non-volatile memory or a register file that may be used to store configuration information. Each microcontroller 256 sends configuration information to the CSM 235 when the bus card to which the microcontroller 256 is addressed by a request from CSM 235. CSM 235 responds to the receipt of configuration information by configuring the voltage connections of the connector 28 as requested by the configuration information. The configuration information may be encoded such that a minimum number of bus write operations to the CSM by the microcontroller 256 are undertaken. The computer system of FIG. 16 operates essentially according to the method shown in FIG. 4.

As described before, the switching circuits described above may be used to remap the voltage connections of a predefined standard to allow lower voltage bus cards to be used in a bus without requiring board space on the bus card for the voltage regulation circuitry to step down the voltage supply by the bus.

Figure 18:
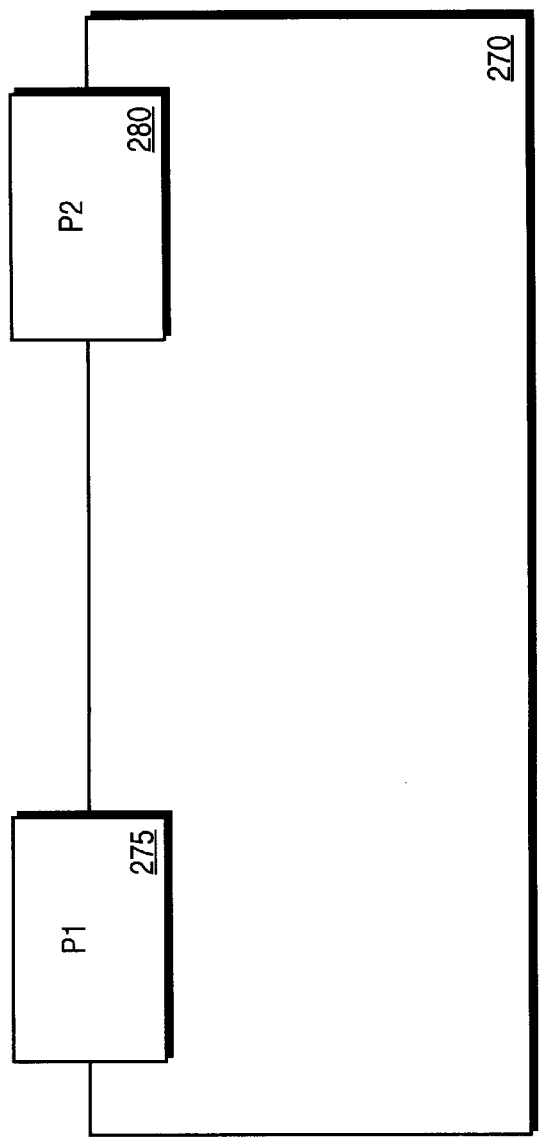
FIG. 18 shows a bus card according to the Multibus II standard wherein each bus card is supplied with a P1 connector and a P2 connector.
Figure 19:
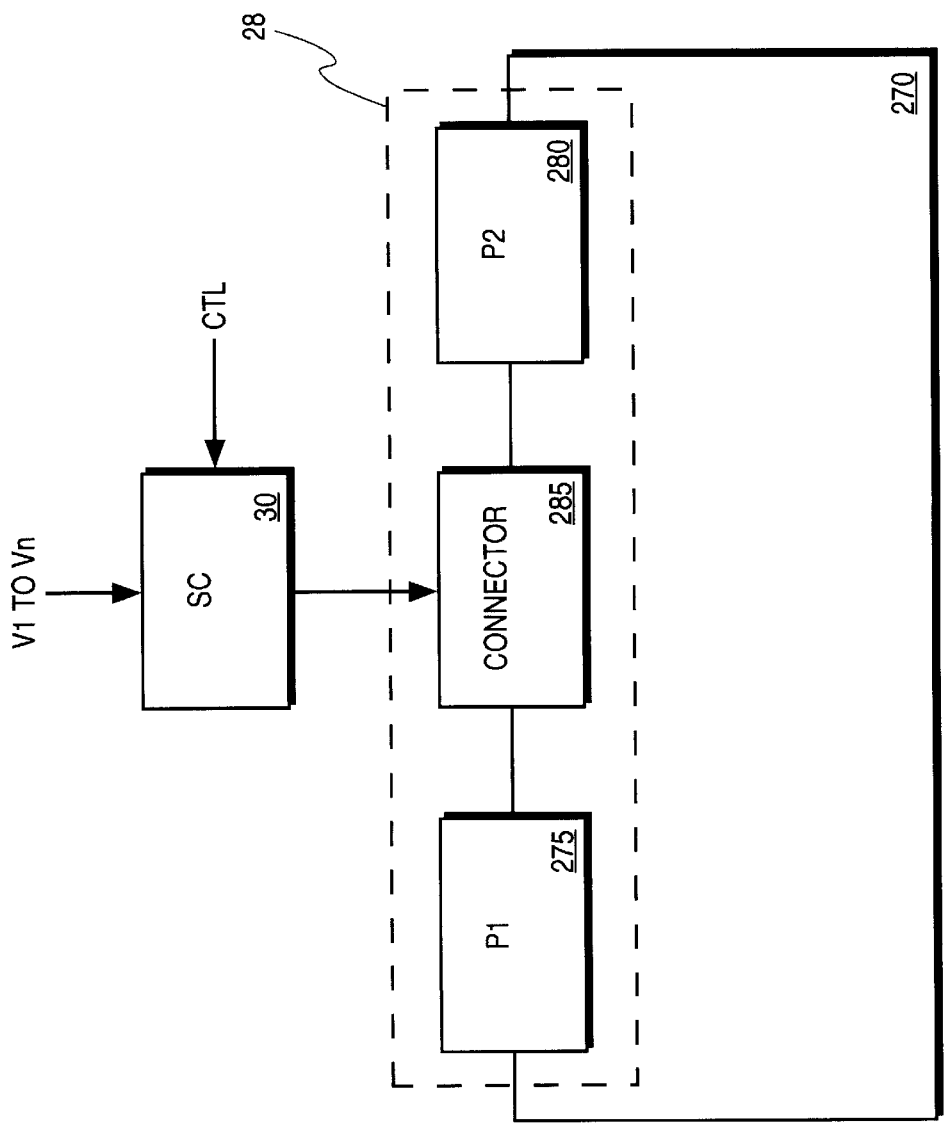
FIG. 19 shows a bus card wherein a switching circuit is used to map the voltages supplied to an added connector.
Figure 20:
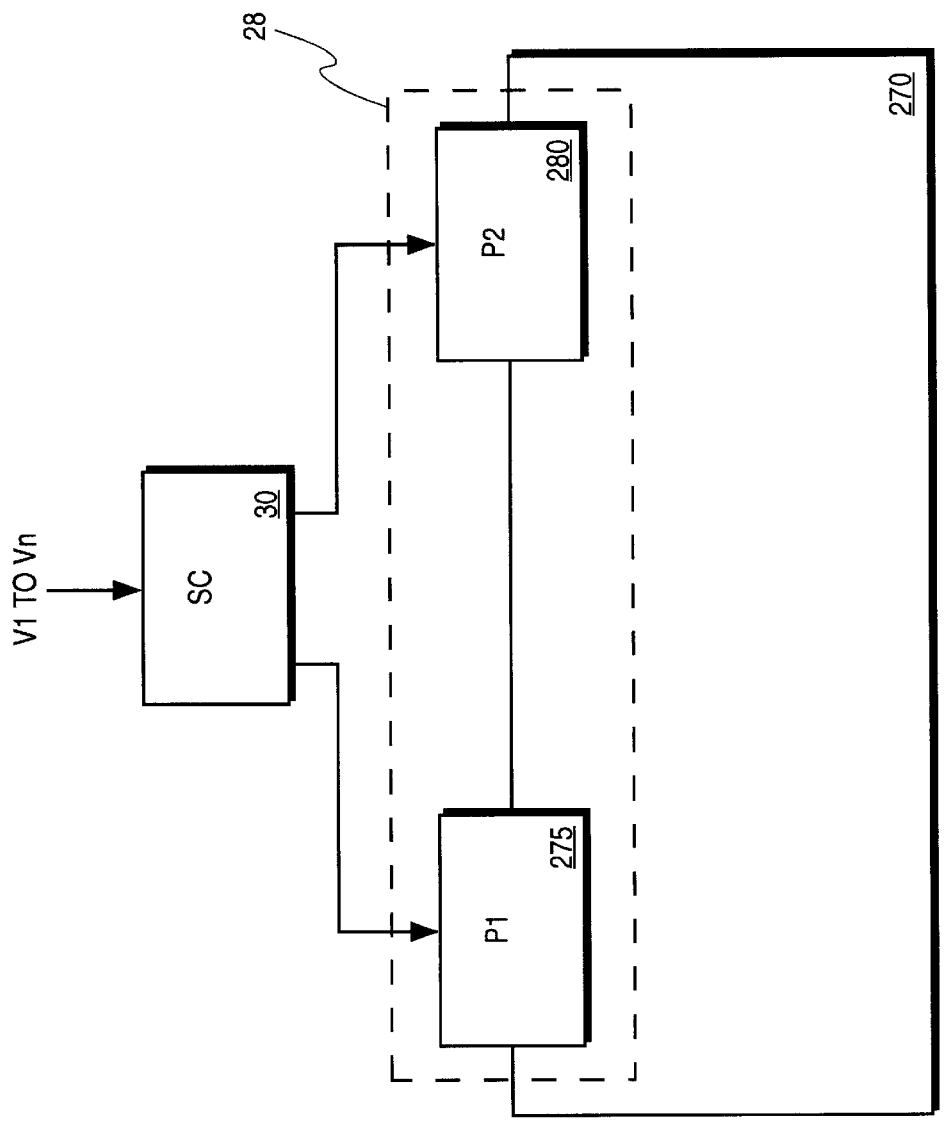
FIG. 20 shows a bus card wherein a switching circuit is used to map the voltages supplied to the bus card.

FIG. 18 shows a bus card 270 according to the Multibus II standard wherein each bus card 270 is supplied with a P1 connector 274 and a P2 connector 280. As shown in FIG. 19, a new connector 285 may be supplied to the bus card 270 and the switching circuit may be used to control mappings of various voltages to the new connector 285. Alternatively, as shown in FIG. 20, the switching circuit may be used to map the connections of connectors P1 275 and P2 280.

According to an alternative embodiment, the number of voltages supplied by the output of the power supply 12 may be reduced, and the switching circuits may be replaced, to some extent, by DC-DC converter circuits that are programmed to output a desired voltage by a power controller or corresponding control logic.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. A computer system comprising:
   a data bus;
   a voltage supply bus carrying a plurality of supply voltages;

a connector, coupled to the data bus, including a plurality of power supply pins, wherein the connector is operative to removably receive a bus card, wherein the bus card includes a configuration circuit that is powered independently from a remainder of the bus card; and a switching circuit coupled in series between the connector and the voltage supply bus for selectively coupling the plurality of supply voltages to one or more of the plurality of power supply pins in response to determining power requirements of the bus card via bi-directional communication with the configuration circuit of the bus card.

2. The computer system of claim 1, wherein a power controller is coupled to the data bus, the computer system further comprising:

at least one control conductor coupled between the switching circuit and the power controller, the power controller for controlling the switching circuit via the control conductor.

3. The computer system of claim 2, wherein the bus card is coupled to the data bus via the connector, the power controller transmitting a power configuration request to the bus card via the data bus, the bus card comprising:

a configuration circuit for responding to the power configuration request by transmitting power configuration information using the data bus, wherein the power controller controls the switching circuit via the control conductor in response to receiving the power configuration information.

4. The computer system of claim 3, wherein the switching circuit comprises a plurality of switches, each switch being coupled between the voltage supply bus and the power supply pins, the power controller for switching on at least one of the switches in response to the power configuration information.

5. The computer system of claim 2, wherein the switching circuit is coupled to the data bus, the power controller using the control conductor to enable the switching circuit to receive power configuration information from data bus.

6. The computer system of claim 5, wherein the bus card is coupled to the data bus via the connector, the power controller transmitting a power configuration request to the bus card via the data bus, the bus card comprising:

a configuration circuit for responding to the power configuration request by transmitting power configuration information via the data bus, wherein the switching circuit selects the one of the plurality of voltages in response to receiving the configuration information from the data bus.

7. The computer system of claim 1, wherein the switching circuit is coupled to the data bus and a control conductor is coupled between the connector and the switching circuit.

8. The computer system of claim 7, wherein the bus card is coupled to the data bus via the connector, the bus card comprising:

a configuration circuit for outputting configuration information via the data bus, and for controlling the control conductor to enable the switching circuit to receive configuration information from the data bus.

9. The computer system of claim 8, wherein the computer system further comprises a power controller coupled to the data bus, the configuration circuit transmitting configuration information in response to a power configuration request initiated by the power controller.

10. The computer system of claim 8, wherein the configuration circuit automatically transmits power configuration information in response to the bus card being connected to the connector.

11. The computer system of claim 1, wherein a plurality of conductors is coupled between the connector and the switching circuit.

12. The computer system of claim 11, wherein the bus card is coupled to the bus via the connector, the bus card comprising:

a configuration circuit for outputting configuration information to the switching circuit using the plurality of conductors.

13. The computer system of claim 12, wherein computer system further comprises a power controller coupled to the data bus, the configuration circuit transmitting configuration information to the switching circuit in response to a power configuration request initiated by the power controller.

14. The computer system of claim 12, wherein the configuration circuit transmits power configuration information in response to the bus card being connected to the connector.

15. A computer system comprising:

a data bus;

a voltage supply bus carrying a plurality of supply voltages;

a connector coupled to the data bus, the connector receiving a bus card having a confirmation circuit powered independently of a remainder of the bus card, wherein the configuration circuit of the bus card is operative to transmit power configuration information via the data bus upon request;

a switching circuit coupled in series between the voltage supply bus and the connector, the switching circuit for selectively coupling supply voltages carried by the voltage supply bus to the bus card via the connector; and a power controller coupled to the data bus and the switching circuit, the power controller operative to issue a request to the configuration circuit of the bus card for power configuration information, and to control the switching circuit to couple supply voltages to the connector to power the remainder of the bus card based, at least in part, on the power configuration information received from the configuration circuit of the bus card.

16. A method for selectively coupling supply voltages from a host to a bus card, the method comprising the steps of:

supplying power to a configuration circuit resident on the bus card without powering a remainder of the bus card;

issuing a request to the configuration circuit resident on the bus card for power configuration information;

transmitting power configuration information from the configuration circuit of the bus card to a power controller of the host via the bus in response to receiving the request for power configuration information;

receiving the power configuration information from the bus card at the power controller of the host; and controlling a switching circuit of the host with the power controller to selectively couple supply voltages to conductors of the bus card to power the remainder of the bus card in response to the receipt of the power configuration information from the configuration circuit of the bus card.

* * * * *

UNITED STATES PATENT AND TRADEMARK OFFICE
CERTIFICATE OF CORRECTION

PATENT NO. : 5,958,056
DATED : September 28, 1999
INVENTOR(S) : Lehmann

It is certified that error appears in the above-identified patent and that said Letters Patent is hereby corrected as shown below:

Column 10,
Line 26, delete "confirmation" and insert -- configuration --.

Signed and Sealed this

Twenty-sixth Day of July, 2005

JON W. DUDAS
*Director of the United States Patent and Trademark Office*